(12) United States Patent
Parker-Bello

(10) Patent No.: US 12,192,398 B1
(45) Date of Patent: *Jan. 7, 2025

(54) SYSTEM, METHOD, AND APPARATUS FOR COORDINATING RESOURCES TO PREVENT HUMAN TRAFFICKING AND ASSIST VICTIMS OF HUMAN TRAFFICKING

(71) Applicant: Brook S. Parker-Bello, Fort Lauderdale, FL (US)

(72) Inventor: Brook S. Parker-Bello, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/647,800

(22) Filed: Jan. 12, 2022

Related U.S. Application Data

(63) Continuation of application No. 16/946,120, filed on Jun. 5, 2020, now Pat. No. 11,240,367.

(60) Provisional application No. 62/857,423, filed on Jun. 5, 2019.

(51) Int. Cl.
| | |
|---|---|
| *H04M 1/72421* | (2021.01) |
| *G06V 40/16* | (2022.01) |
| *G08B 25/01* | (2006.01) |
| *H04W 4/021* | (2018.01) |

(52) U.S. Cl.
CPC ...... *H04M 1/72421* (2021.01); *G06V 40/172* (2022.01); *G08B 25/016* (2013.01); *H04W 4/021* (2013.01)

(58) Field of Classification Search
CPC . H04M 1/7242; G06V 40/172; G08B 25/016; H04W 4/021
USPC ...................................................... 340/573.1
See application file for complete search history.

(56) References Cited

U.S. PATENT DOCUMENTS

| | | | |
|---|---|---|---|
| 9,565,527 B1* | 2/2017 | Anderson | H04W 4/50 |
| 10,540,875 B2* | 1/2020 | Abeyta | G08B 21/0423 |
| 10,701,541 B2* | 6/2020 | Mehta | H04W 64/00 |
| 10,701,542 B2* | 6/2020 | Martin | H04L 67/02 |
| 10,820,181 B2* | 10/2020 | Horelik | H04W 4/14 |
| 11,129,010 B2* | 9/2021 | Wickham | H04W 4/029 |
| 2004/0263338 A1* | 12/2004 | Katz | G08B 21/10 |
| | | | 340/539.12 |
| 2010/0324968 A1* | 12/2010 | Schoettle | G06Q 10/06 |
| | | | 705/26.1 |
| 2012/0268269 A1* | 10/2012 | Doyle | G08B 21/22 |
| | | | 340/539.13 |

(Continued)

*Primary Examiner* — Zhen Y Wu
(74) *Attorney, Agent, or Firm* — Squire Patent Consulting & IP Law LLC; Brendan E. Squire

(57) ABSTRACT

A human trafficking case management and mentoring system, Coming Home, is a centralized system that seamlessly links victims of human trafficking with a Coming Home trained and licensed case manager mentor via an app that is accessible to the victim via a mobile communications device. The Coming Home case manager mentor coordinates one or more supporting services based on the current situation of the victim. Forward looking services assist the victim in recovery from their life within a human trafficking environment. The app includes a plurality of configurable victim activated tools to facilitate victim access for the employment of emergency services and protective measures to facilitate the victim's safety while using the app. The victim activated tools may include a camouflage screen tool: a geo-fencing/tracking tool; a facial recognition tool; a reporting HT Distress reporting tool; and a direct 911 emergency tool.

16 Claims, 7 Drawing Sheets

(56) References Cited

U.S. PATENT DOCUMENTS

| | | | |
|---|---|---|---|
| 2013/0035612 A1* | 2/2013 | Mason | A61B 5/1128 600/595 |
| 2013/0065628 A1* | 3/2013 | Pfeffer | G08B 25/016 455/521 |
| 2013/0246296 A1* | 9/2013 | Sierra | G06Q 30/0279 705/329 |
| 2013/0268848 A1* | 10/2013 | Pena | G06Q 10/109 715/255 |
| 2014/0134969 A1* | 5/2014 | Jin | H04W 4/90 455/404.1 |
| 2015/0142897 A1* | 5/2015 | Alten | H04L 51/56 709/206 |
| 2015/0227761 A1* | 8/2015 | Cohen | H04L 51/216 726/30 |
| 2015/0230072 A1* | 8/2015 | Saigh | H04W 4/90 455/404.1 |
| 2015/0288797 A1* | 10/2015 | Vincent | G16H 10/60 455/404.2 |
| 2016/0071399 A1* | 3/2016 | Altman | H04M 1/72421 340/539.11 |
| 2016/0371968 A1* | 12/2016 | Almansour | G06Q 10/00 |
| 2017/0140629 A1* | 5/2017 | Briggs | G08B 21/0453 |
| 2017/0149795 A1* | 5/2017 | Day, II | H04W 12/088 |
| 2017/0213001 A1* | 7/2017 | Harrison | G16H 40/63 |
| 2018/0052512 A1* | 2/2018 | Overly | G06F 3/165 |
| 2018/0097755 A1* | 4/2018 | Mody | H04L 51/046 |
| 2018/0184255 A1* | 6/2018 | Marson | H04W 12/64 |
| 2018/0189913 A1* | 7/2018 | Knopp | H04W 4/021 |
| 2018/0352150 A1* | 12/2018 | Purwar | G06T 7/536 |
| 2019/0087645 A1* | 3/2019 | Agarwal | G06V 40/172 |
| 2019/0180245 A1* | 6/2019 | Weindling | G06F 3/0484 |
| 2019/0318315 A1* | 10/2019 | Clark-Lindh | G06N 20/00 |
| 2019/0348168 A1* | 11/2019 | Owens | G16H 20/70 |
| 2020/0233910 A1* | 7/2020 | Bhide | G06F 40/40 |

* cited by examiner

SYSTEM, METHOD, AND APPARATUS FOR COORDINATING RESOURCES TO PREVENT HUMAN TRAFFICKING AND ASSIST VICTIMS OF HUMAN TRAFFICKING

CROSS-REFERENCE TO RELATED APPLICATION

This application is a continuation application of U.S. patent application Ser. No. 16/946,120, filed Jun. 5, 2020, and claims the benefit of priority of U.S. provisional application No. 62/857,423, filed Jun. 5, 2019, the contents of which are herein incorporated by reference.

BACKGROUND OF THE INVENTION

The present invention relates to human trafficking and more particularly to resources to prevent further human trafficking and to assist and provide resources, and services to victims of human trafficking.

Victims of human trafficking require coordination of services that often span local, state, and national and over global boundaries. Often, victims are caught up in global networks that presently, there is no system that can effectively reach victims wherever they may be located and provide critical services for them no matter their circumstance.

For decades no one noticed victims of human trafficking. and it was medical professionals, therapist, law enforcement, even our federal agencies and other responders from around the national and parts of Europe and other countries coming to us to be trained on "how" to identify and support victims and to learn what success and workflow looks like for victims so that they can discover what it means to survive. So, we know that objectives for each victim; (goals), measurements, documentation of (tasks and challenges) and outcomes are crucial. However, unlike anything the medical (mental or physical health) field or other responders systems and apps or combined out there does not gear itself towards the COMING HOME online human trafficking case management system and mobile application.

Until now, unique, and often misunderstood services as well as identification of victims of human trafficking, have been challenged with prosecutions of violators down and fear in victims to come forward. Note, that Coming Home is designed by a former child survivor, who saw victimization where others could not. Within the Coming Home environment, case management is called mentoring because victims are very sensitive to certain terms and therefore, language is key in reaching the victims where they are as most victims do not come forward.

SUMMARY OF THE INVENTION

In one aspect of the present invention, a human trafficking case management and mentoring system (Coming Home) is disclosed that seamlessly links a victim of human trafficking with a plurality of human trafficking recovery and prevention resources. The system includes a Coming Home server hosting access to the plurality of human trafficking recovery and prevention resources.

A mobile computing device operated by the victim, is provisioned with a Coming Home app providing a plurality of configurable victim activated tools to facilitate victim access to the plurality of recovery resources hosted by the Coming Home server. The plurality of configurable victim activated tools includes a camouflage screen module configurable to mask one or more of a presence and a utilization of the Coming Home app on the mobile computing device by victim selection of an innocuous app launch icon to mask the presence of the Coming Home app on the mobile computing device. A HT distress reporting tool is configured to receive a victim alert message and activate an HT distress reporting system hosted by the Coming Home server, when the victim alert message is transmitted the Coming home server, upon receipt of the victim alert message the HT distress reporting system is configured to automatically convey the victim alert message to a national human trafficking hotline.

In some embodiments, the HT distress reporting system also includes transforming the victim alert message to an e-mail message protocol when the victim alert message is received via one of a text or an SMS message. The victim alert message is then conveyed to the national human trafficking hotline via the e-mail message protocol. The victim alert message may be synchronized with the national human trafficking hotline in real time.

In some embodiments, the plurality of configurable victim activated tools a facial recognition tool configured to receive a selfie facial image of the victim taken by the mobile computing device operated by the victim. The selfie facial image is transmitted to the Coming Home server.

In some embodiments, the facial recognition tool includes assessing the selfie facial image to detect a sufficient number of facial recognition reference points to provide an accurate recognition of the victim based on the selfie facial image.

Responsive to receiving a victim opt in command at the Coming Home server, the selfie facial image may be shared with one or more law enforcement services.

In some embodiments, the plurality of configurable victim activated tools includes a geofence tool that is configured to receive a victim input enabling a real time tracking of a victim position information received at the Coming Home server from the mobile computing device. Responsive to receiving a victim input enabling communication of an alert by the Coming Home server to a law enforcement agency, an alert may be the alert may be transmitted when the victim's position information indicates a victim movement into a restricted area.

In other embodiments, the plurality of configurable victim activated tools may also include a journal tool configured to receive a victim journal entry from the mobile computing device. A journal storage is hosted by the Coming Home server to store the victim journal entry in a repository uniquely accessible by the victim. A journal entry may be retrieved by the mobile computing device from the repository uniquely accessible by the victim.

In other embodiments, in response to receiving a victim alert, directing, by a mentor, an action. The action is one or more of a collaboration action, a law enforcement action, and a services action, based on an assessment of the victim alert by the mentor. The action is communicated one or more partners interconnected through the Coming Home server, wherein the one more partners is selected from the group consisting of a mentor, an advocate, a law enforcement agency; a social worker; an anti-human trafficking expert, a medical doctor, a mental health professional; and an educator.

In yet other embodiment, at least one of the plurality of recovery resources is an e-learning system, hosted by the Coming Home server. The e-learning system serves a curriculum directed to one or more of a human trafficking recovery program of instruction and a human trafficking prevention program of instruction.

In other embodiments a jobs system connecting the victim with one or more vetted job opportunities vetted through a Coming Home server host is provided.

In other embodiments, at least one of the plurality of recovery resources is a goals/tasks/challenges module. The goals/tasks/challenges module is a collaboration service hosted by the Coming Home server enabling a mentor and the victim to collaborate in setting of one or more of a goal, a task, and a challenge. The one or more of the goal, the task, and the challenge are stored in a database accessible by the victim through the Coming Home app. The goals/tasks/challenges module may also provide a reminder in the Coming Home app for a scheduled event associated with the one or more of the goal, the task, and the challenge. A completion indicator is selectable by the victim to show the completion of a selected one of the one or more of the goal, the task, and the challenge. The completion indicator and the selected one of the one or more of the goal, the task, and the challenge is transmitted to the Coming Home server.

A leaderboard hosted by the Coming Home server is configured to display a real time tracking of the completion indicator for each the selected one of the one or more of the goal, the task, and the challenge.

These and other features, aspects and advantages of the present invention will become better understood with reference to the following drawings, description and claims.

DETAILED DESCRIPTION OF THE INVENTION

Figure 1:
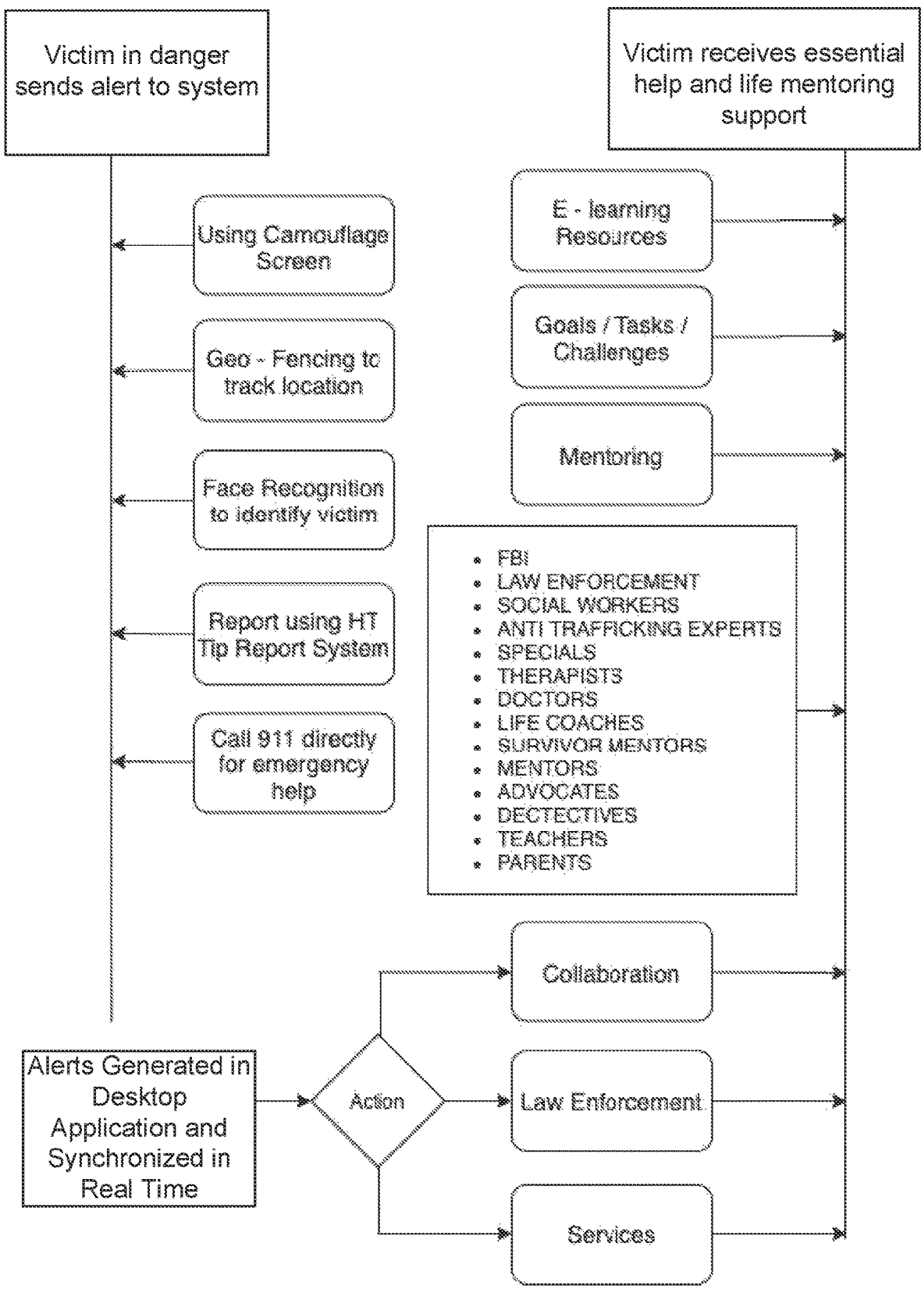
FIG. 1 is a diagram illustrating a human trafficking case (mentor) management and mentoring resource system.
Figure 2:
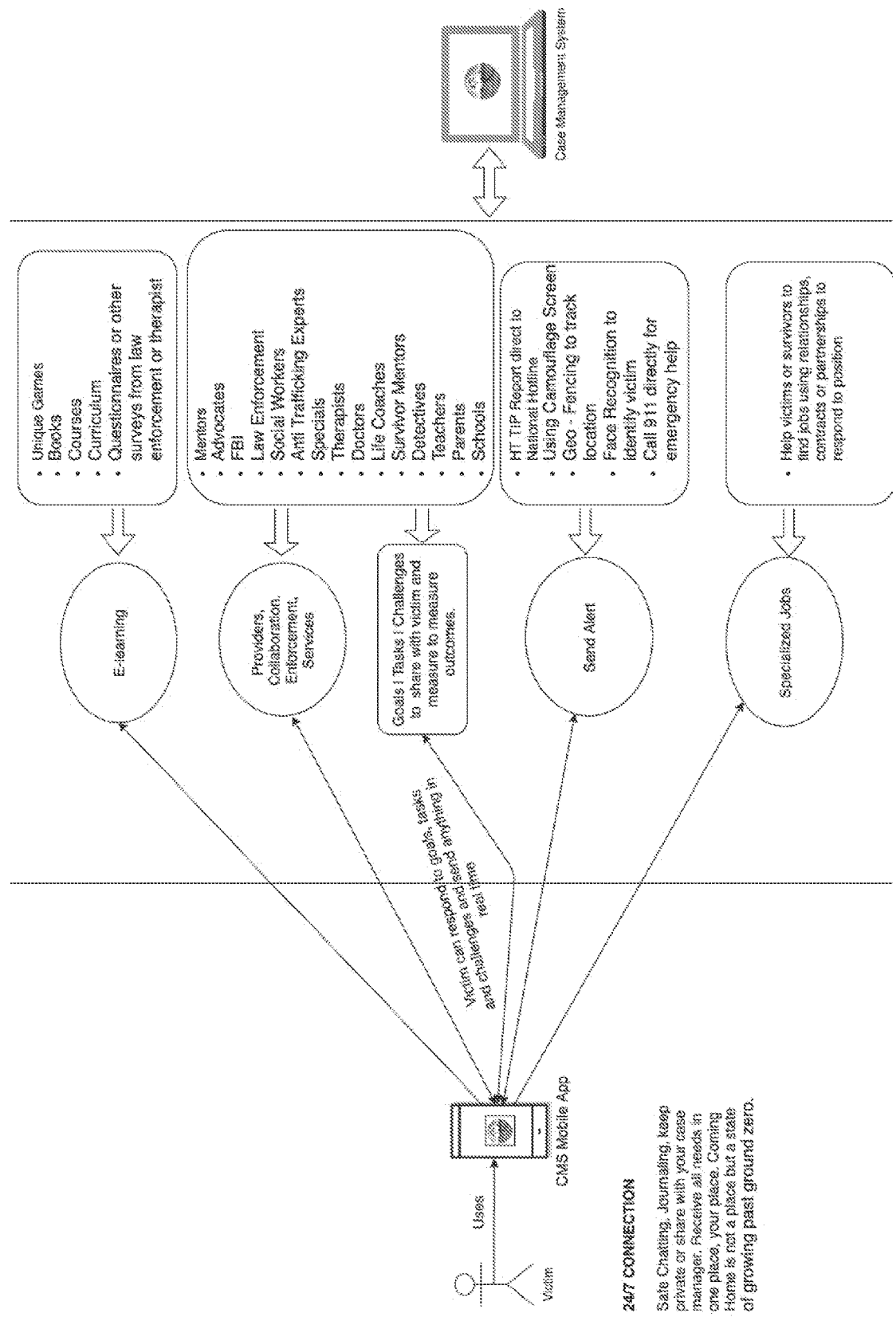
FIG. 2 is a diagram illustrating module capabilities and interrelationships.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system, method, and apparatus for coordinating resources to prevent human trafficking and assist victims of human trafficking.

Aspects of the human trafficking case management and mentoring system, referred to hereinafter Coming Home, is illustrated in reference to FIG. 1. Coming Home is a centralized system that seamlessly links victims of human trafficking with a Coming Home trained and licensed case manager mentor via an app that is accessible to the victim via a mobile communications device, such as a smart phone, tablet, and the like. The Coming Home case manager mentor coordinates access to or employment of one or more supporting services based on the current situation of the victim and forward-looking services to assist the victim in recovery from their life within a human trafficking environment.

The app includes a plurality of configurable victim activated tools to facilitate victim access to Coming Home for the employment of emergency services and protective measures to facilitate the victim's safety while using the app. The victim activated tools may include a camouflage screen tool: a geo-fencing/tracking tool; a facial recognition tool; a reporting HT Distress reporting tool; and a direct 911 emergency tool.

Camouflage Screen Tool

The app is configured with a camouflage screen tool that masks the presence or utilization of the app on the victim's mobile computing device. One aspect of the camouflage screen feature may be provided through a victim selection of an app launch icon to mask the presence of Coming Home as an app that is resident on the victim's mobile computing device. The icon may be configured by the user to present an innocuous app launch icon to avoid detection of the app by the victim's traffickers. Likewise, the individual tools and discrete modules in the Coming Home system are presented to avoid detection of Coming Home as a victim reporting and assistance app. Using Camouflage Screen, helps the victim hide that they have the app or what they are using the app for at the click of a button, either a hardware button of the mobile device or a software button activated from the screen of the mobile device.

Geo-Fencing Tool

A geo fencing module may be incorporated in order to track the victim's location. The geo-fencing module may be activated by the victim in an urgent or emergent situation to permit tracking of their location by Coming Home. The geo fencing module is configured to receive positioning information from the victim's mobile computer device and transmit the positioning information to the Coming Home servers. The positioning information may include one or more of a GPS data, an IP address, and a cellular communications network tower. The geo-fencing module may also be activated to facilitate the victim's participation in a court ordered probation program to permit probation officers monitor the victim's compliance with their terms of probation. In this mode, the victim's current position may be masked from the probation officer, unless the Coming Home servers detect the victim's movement into a restricted area designated by their terms of probation or when exceeding a specified range from a designated location, such as their residence, their work location, or a designated route (such as a public transit route) to a service provider supporting the victim's recovery. Accordingly, the geo-fencing module may be utilized during crisis situations, especially minor victims and even adults in trouble. The geo-fencing module may also be utilized to assist the victim on their path to recovery through Coming Home.

Facial Recognition Tool

The victim may also elect whether to provide Coming Home with an image of the victim to facilitate both crisis events and to assist the victim on their path to recovery. In a crisis mode, the victim may elect to share their facial image for law enforcement services. This aspect is provided only when the victim opt in to allow law enforcement the ability to utilize a user provided facial image to facilitate a search to determine whether traffickers have posted images of the victim anywhere in the world, particularly in the online environment. The facial recognition module is configured for the user to take a selfie facial image and transmit the image to Coming Home. The facial recognition module may also be configured to perform an initial assessment of the selfie facial image for detection of a sufficient number of facial recognition reference points to provide an accurate recognition of the victim. The initial assessment provides the victim immediate feedback to the victim before transmission to Coming Home for storage in a victim's user profile. The facial recognition tool may also include functionality to determine an emotional state of the victim when accessing the Coming Home app. The facial recognition tool works with an artificial intelligence engine to assess one or more biometric parameters such as an eye movement, body language, a vocal condition, or facial expression to determine an affect or an emotional state or an of the victim.

HT Distress Report System

Whether in direct danger or engaged in Coming Home recovery services, the victim may utilize the HT Distress Reporting System, because most human trafficking victims are afraid to contact law enforcement, even in an emergency. Therefore, our research shows that the human trafficking victim may be more comfortable or willing to work with a specialized advocate to be there when the human trafficking victim is in immediate need of assistance.

An aspect of the Coming Home HT Distress Report system is that when the human trafficking victim enters information into a HT Distress Report, the HT Distress Report system transforms a victim alert message that they input, that is sent via a text, SMS, or an e-mail message, into an email message protocol, which is then conveyed directly to the national human trafficking hotline. The e-mail message is automatically conveyed in an instant, where the e-mail message is then seen by national hotline expert. All alert messages are synced by Coming Home in real time to the national human trafficking hotline.

The national hotline expert may then contact advocates and/or law enforcement, depending on the needs of the situation, to those in proximity to the location of the victim. The HT Distress Report system connects to a network of over 3000 agency services in over 200 countries that partner with the national hotline. The HT Distress Report system provides victim advocates and/or reliable law enforcement entities with the needed details so that victims are not mistaken as criminals. This aspect prevents and preempts a trafficker that may lie and report the victim as an addict, or in the event the trafficker has hidden a child victim and once alerted the victim becomes hard to find.

911 Emergency Call Module

When the victim has new evidence, is struggling, or has even run away and desires to come home, the victim can always call 911 through the 911 emergency call module.

Coming Home Recovery Services

As seen in reference to FIG. 1, the victim alert messages are received by Coming Home and are assessed by a mentor for an action based on the contents of the alert message. The action may include one or more of initiating a collaboration, notifying the employment and support of the assigned advocate agency or even appropriate law enforcement agencies, for human trafficking victim's recovery.

Once the human trafficking victim has enrolled with Coming Home, the system is configured with a plurality of modules to assist the victim on their path to recovery. Their path to recovery includes essential help and life mentoring support to the victim in recovery. The recovery services include an E-Learning Resource module, a Goals/Tasks/Challenges module, a Mentoring Module. Each of the recovery services are provided by a mentor, or case manager, who is specifically trained in human trafficking victim recovery needs, resources, and services. The mentor may communicate with the human trafficking victim via the app on the victim's mobile computing device.

Mentoring

Mentoring module connects each human trafficking victim to all their needs, services, and resources. These may be requested by the victim, recommended by the mentor, and oftentimes required by law or court order. A case manager/mentor is assigned to manage the flow of resources for the human trafficking victim. Mentoring may be accomplished through e-mails, messaging, live chat functionality, text or SMS messaging, and telephonic communications with the human trafficking victim.

Coming Home may also include a virtual reality engagement area where a victim and a mentor may conduct an encounter. The virtual realty engagement area permits each of the victim and the mentor to be presented as a virtual representation to avoid prejudgments and prejudices based on their respective personas. The virtual engagement area may present a simulated environment, such as a beach, a forest, a garden, or other user selected space that is pleasing or nonthreatening to the victim. The virtual reality engagement area may be augmented with the facial recognition module to translate the victim and the mentor's facial and body movements within the virtual reality engagement area. The virtual reality engagement area along with the facial recognition module is combined with the AI module to assess the victim's affect within the virtual reality engagement area.

E-Learning Module

There are unique games, books, courses and curriculums that victims and survivors need that are unique to other types of pain and trauma, whether the victim is five years old with their parent or guardian or an adult over eighteen years of age. Coming Home is able to deliver those courses or curriculums of study in a safe place and for downloading for offline use when applicable.

Jobs Module

One of the hardest things for victim/survivors is to find jobs that lead to careers. With Coming Home, again, through relationships, contracts, and partnerships we connect victims, regardless of whether they are teens or young adults 18 and over with job opportunities that are vetted, contracted, and trained and waiting for them to respond to positions via the application interface.

Goals, Tasks and Challenges Module

Goals

The Coming Home facilitates the human trafficking victim's path to recovery through the Goals, Tasks, and Challenges Module. Goals may include personal growth goals required to make recovery possible. These goals may include freedom from addictions, not only to drugs and alcohol, but also the unique addictions that adversely affect human trafficking victims' recovery. These goals may also include reconciliation with estranged family, furthering their education, finding a job, locating suitable housing, and the like. The human trafficking victim sets their goals in coordination with their mentor. The goals are presented via the app as a reminder and source of encouragement.

Tasks

The app is configured to facilitate recovery and attainment of the victim's goals through Tasks. The Tasks may include things such as therapy sessions, court hearings, meetings with law enforcement/probation officers, check ups for forensic evidence gathering, or all of the other meetings associated with the mentor/case manager/advocate or even law enforcement, attorneys, trials. The tasks may include steps for finding a new and safe place to live. The tasks established through collaboration with the professional mentor/case manager who helps to lead and encourage the victim along the path to recovery.

Challenges

Challenges are unique to each victim, depending where the victim is in recovery. The human trafficking victim may need services and resources for 3 to 5 years or more and one key challenge is not giving up. The victim can be challenged by their mentor, partnering law enforcement and other collaborating providers to stay the course by remembering that their greatest challenge is discovering who they really are and the ultimate purpose, career and meaning of their life after so much trauma. Victims in recovery, now survivors, can challenge themselves by setting one or more challenges. Alternatively, the mentor can initiate one or more challenges for the survivors. Support for challenges may be provided up to the day they have children, get married, and face many other fears that victims didn't see coming in their path to recovery.

It is important to note that as survivors build their new lives they may have severe moments or trust issues. Also, they live in fear that the traffickers will attempt to find them and cause more pain, or they are trying to believe that a life away from human trafficking is even possible for them. Another reason for the consistency of the system and app. Once they have a user name and login, the victim in recovery can always reach the provider agency in a way that the victim deem comfortable. Our research indicates that it is a rare event that they make phones call when they can text so they tend to be programed to use technology via mobile devices and now for the first time they will have this tool in their hands.

In addition, the use of "one system" that each anti-trafficking agency assigned can add law enforcement, therapist and a vetted resource provider to be able to connect with our victim/mentee in one place for their own safety and ease of mind of knowing who is on the other side is crucial to a victim getting to safety or understanding that they are safe. It also saves the professional provider time and systems to locate victims and to uncover needed data. Oftentimes, data is in too many places and Coming Home makes it easier for victims to heal, gain evidence of human traffickers to be archived and cost less for state and federal dollars.

Journal

Coming Home also provides a journal component that permits human trafficking victims to record their thoughts and feelings as they are on their road to recovery. Journaling in our services is a key aspect of healing. Often times victims lose journals, mobile devices, burner phones from traffickers and their own documented history. In this dual connected journal, the victim can share their healing journal or not. But it is never lost and as soon as they have a new device and download the app their journal is there waiting for them in a safe place. Needed details of their life, case and journey are documented for their personal growth and use.

In addition, Coming Home may integrate questionnaires or other surveys from law enforcement or therapists, for example, that can be applied and saved, dated and checked off in the mobile app and online system. The victim can send responses, and notes, pictures and even proof of work and have a little fun doing it with the positive feelings of reward.

Administration Module

Figure 3:
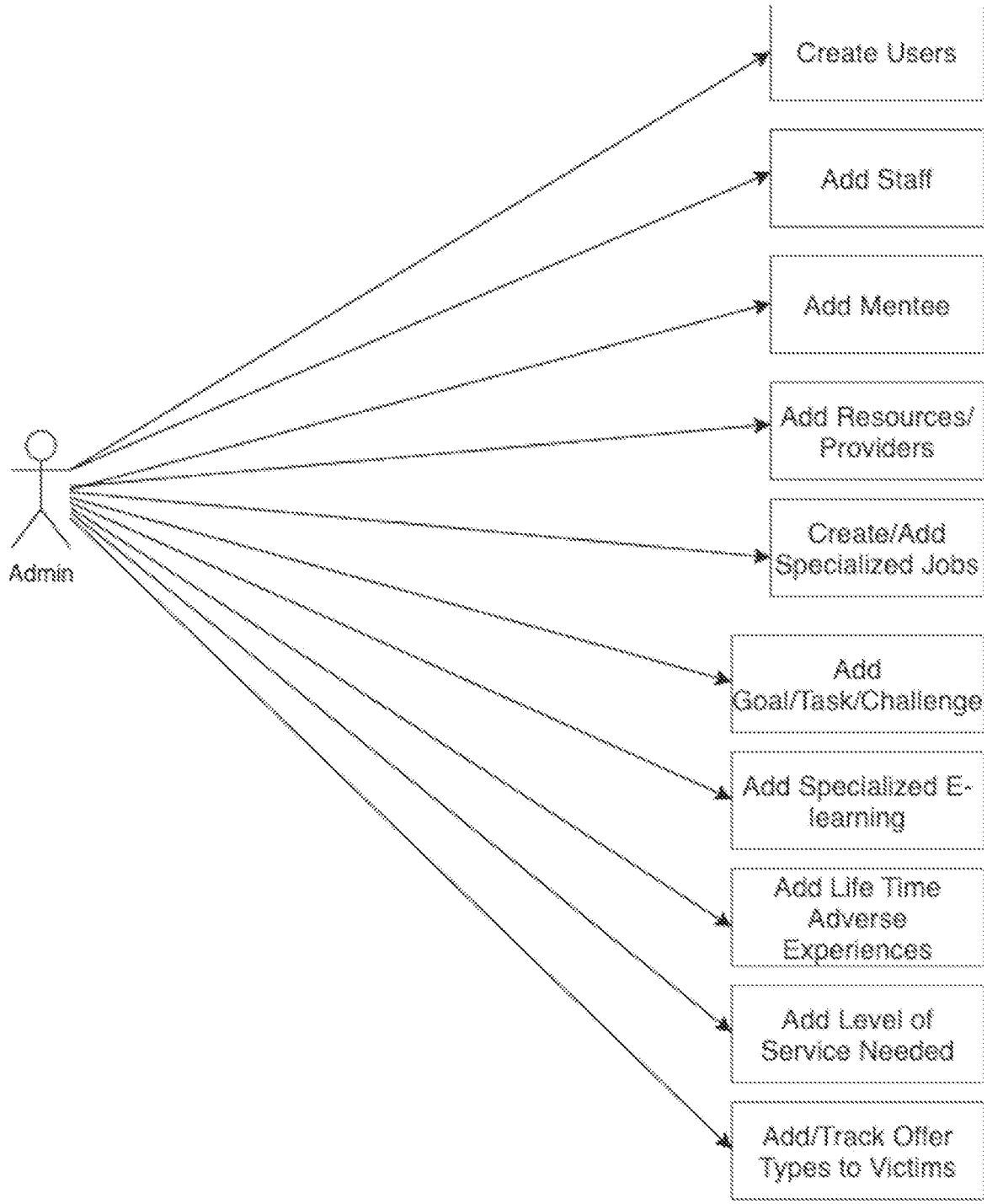
FIG. 3 is a diagram illustrating capabilities of an administrator module.

As seen in reference to FIG. 3, an administration module is provided to permit the creation of user accounts, add staff members, add a mentee, add victim resources and providers. The admin module may also include creating or adding specialized jobs to meet providers, collaboration, enforcement, and services that lead to action.

The main admin for an anti-human trafficking agency or other first responder agency can be an admin to their own Coming Home system connection and adapt it as needed to fit certain urgent or required protocols for their agency. The Coming Home network interconnects Mentors, Advocates, FBI, Law Enforcement, Social Workers, Anti Trafficking Experts, Specialists, Therapists, Doctors, Life Coaches, Survivor Mentors, Detectives, Teachers, Parents, Schools, and many other providers.

However, if an agency, does not want their own admin module, individuals designated by the agency to assist a particular victim, or category of service, can be added to Coming Home as a "resource provider" for a limited time they are partnering with the admin agency to advocate for the victim/survivor. Therefore, it makes it much easier for example, members of law enforcement to be trusted by fearful victims. The admin can connect the victim to any one of the above needs at any time 24/7 and the above providers can connect with the admin or the victim depending on their level of use.

Figure 4:
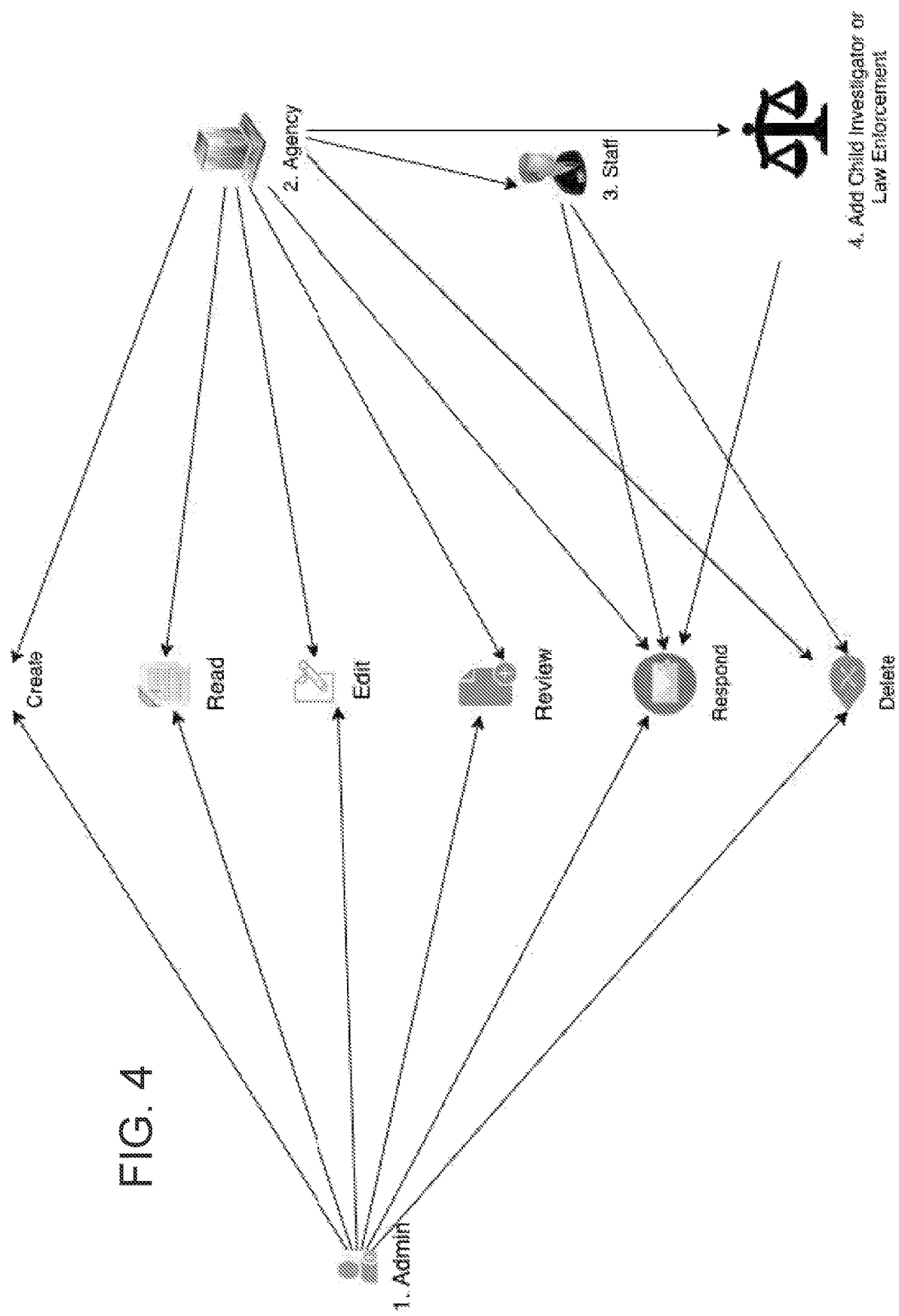
FIG. 4 is a diagram illustrating participating resource types and permissions.

As seen in reference to FIG. 4, depicting a user types and permissions, Coming Home is configured to provide access to system resources according to a user type, designated by an admin. The admin can create, read, edit, review, respond, and delete capabilities throughout the system. An agency having its own admin may implement the same functionalities on behalf of the agency. Staff designated by an agency may be provided one or more functionalities as designated by the agency. For example, certain staff may be provided permissions to respond to and delete, as designated by the agency admin. An agency may also designate a child investigator or law enforcement officer to respond to messages in the system.

Figure 5:
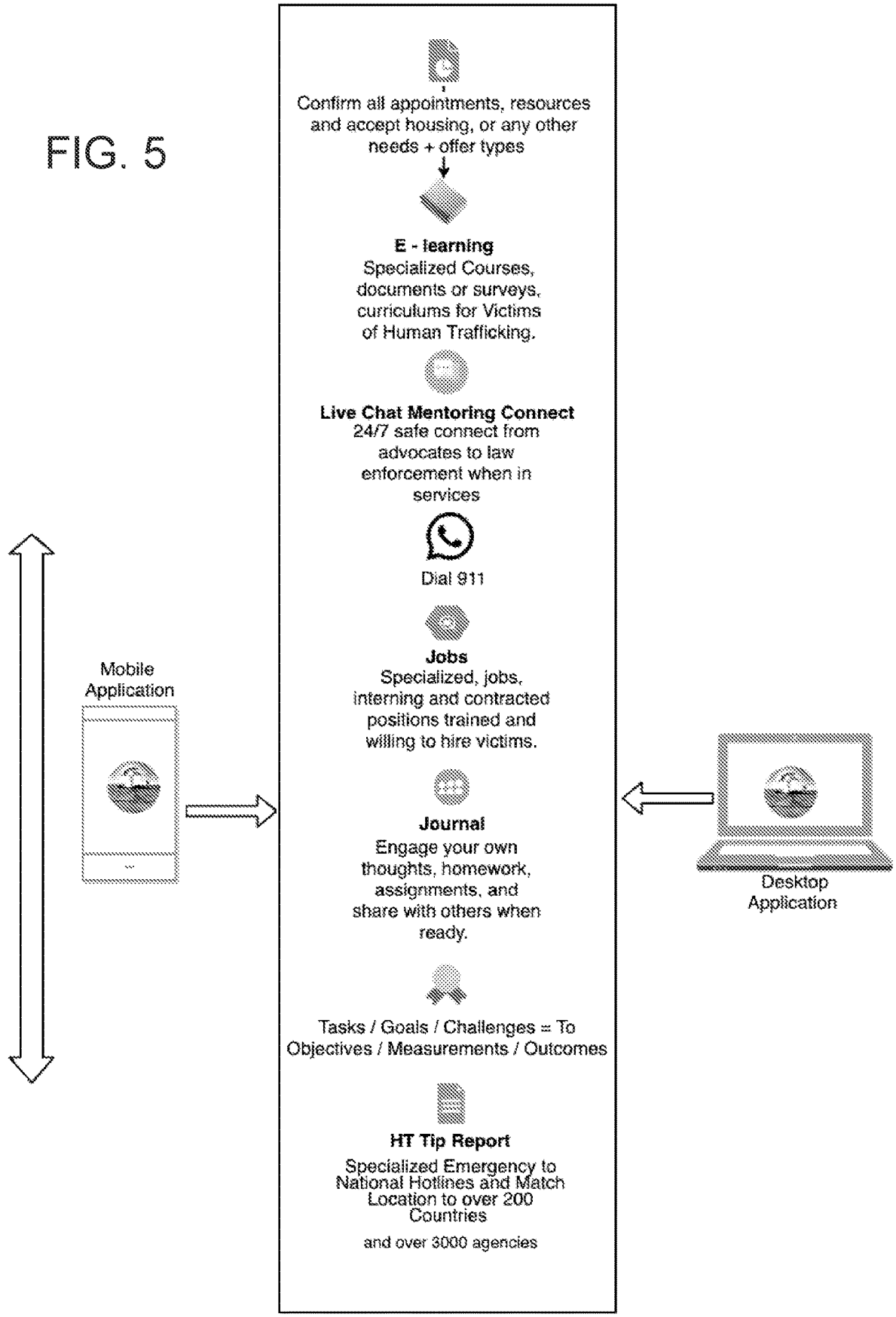
FIG. 5 is a diagram showing functional modules of the human trafficking case management and mentoring system.

As seen in reference to FIG. 5, Coming Home provides for seamless integration with appointments and scheduling through the Goals, Tasks, and Challenges module. Educational resources are integrated through the E-Learning module. Live chat capability is provided on a 24/7 basis to connect human trafficking victims with mentoring and safely connects victims with advocates and law enforcement services.

Figure 6:
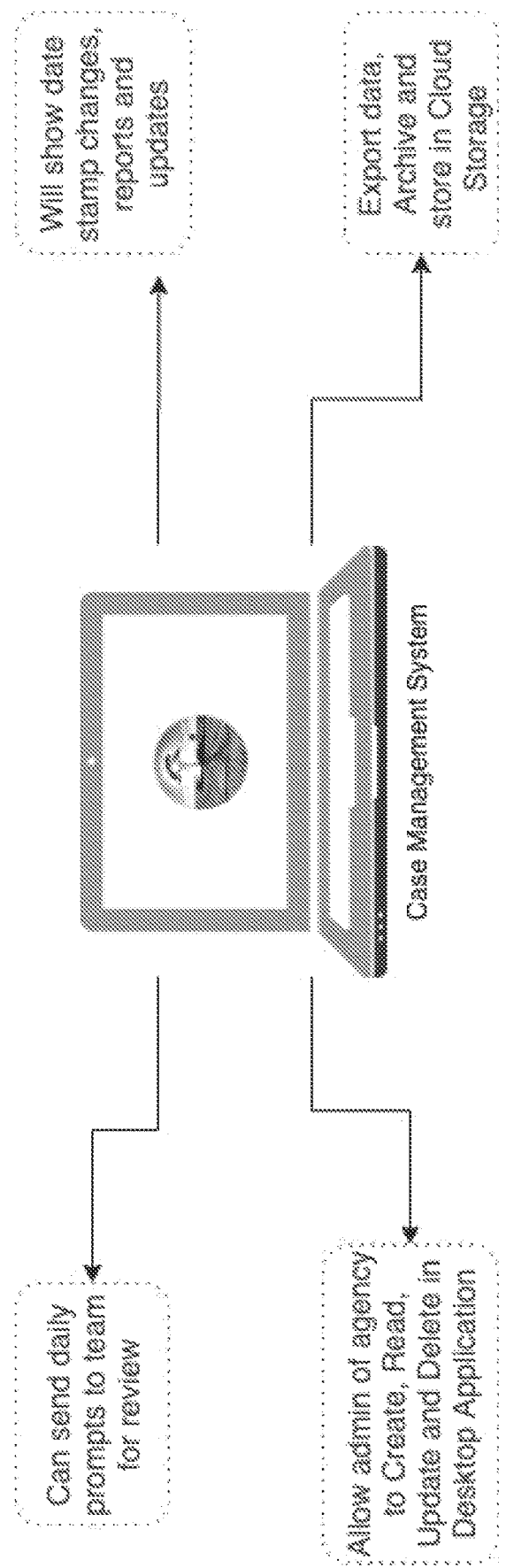
FIG. 6 is a diagram illustrating interrelationships of the case management system.
Figure 7:
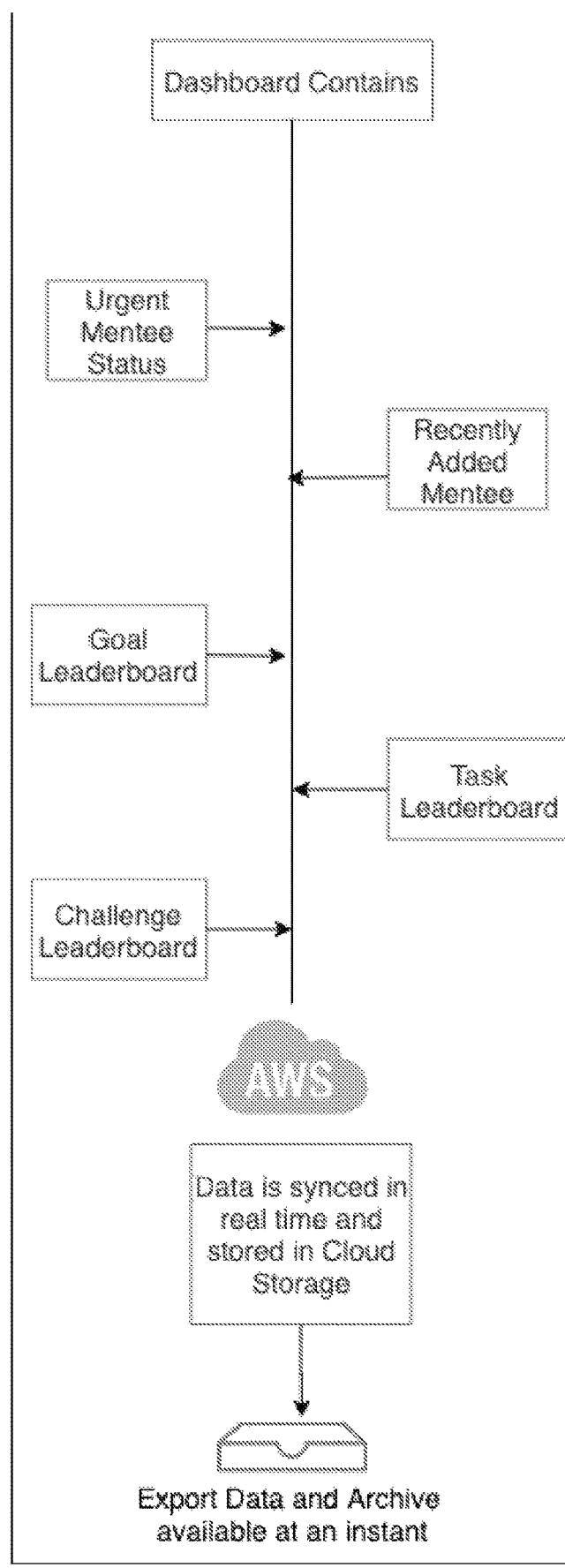
FIG. 7 is a diagram of a representative system architecture and dashboard capabilities.

As seen in reference to FIGS. 6 and 7, Coming Home provides a comprehensive interface to provide daily prompts to recovery team members to review. Admin functionality is provided for designating types and permissions. Each report and update are provided with date time stamps, along with changes and updates to reports. Coming Home also provides for export of data, and archival and storage in a Cloud Storage. A Coming Home dashboard may provide indicators for various metrics and status within the system. By way of example an urgent mentee status indicator, reflecting a current status of the human trafficking victim in a crisis or emergent situation. A recently added mentee indicator provides an alert for a recently joined victim that needs to be addressed by the mentor. A goal leaderboard may be provided to provide the mentor a relative ranking of the progress of recovering victims in the attainment of their goals. Likewise, tasks and challenge leaderboards may be provided for providing the mentor a relative ranking of the victims in achieving their tasks or meeting challenges. The dashboard data is synched in real time and stored in a Cloud storage, such as Amazon Web Services.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

I claim:

1. A human trafficking case management and mentoring system (Coming Home) that links a victim of human trafficking with a plurality of human trafficking recovery and prevention resources, the system comprising:
   a Coming Home server hosting access to the plurality of human trafficking recovery and prevention resources;
   a mobile computing device operated by the victim, provisioned with a Coming Home app providing a plurality of configurable victim activated tools to facilitate victim access to the plurality of HT recovery resources hosted by the Coming Home server, the plurality of configurable victim activated tools including;
   a virtual reality engagement area presented as a simulated environment where the victim and a mentor may conduct an encounter, wherein the virtual reality engagement area permits each of the victim and the mentor to be presented as a virtual representation within the virtual reality engagement area;
   a facial recognition module configured to translate one or more of a victim facial movement and a victim body movement with the virtual representation of the victim within the virtual reality engagement area; and
   an artificial intelligence (AI) module configured to assess a victim affect within the virtual reality engagement area, based on the one or more of the victim facial movement and the victim body movement.

2. The human trafficking case management and mentoring system of claim 1, the plurality of configurable victim activated tools further comprising:
   a distress reporting tool configured to transmit a victim alert message and activate a human trafficking (HT) distress reporting system hosted by the Coming Home server;
   when the victim alert message is received at the Coming Home server via one of a text or an SMS message, transforming the victim alert message to an e-mail message protocol;
   automatically transmitting the victim alert message to a national human trafficking hotline by the Coming Home server via the e-mail message protocol in real time; and
   responsive to receiving the victim alert, directing, by the mentor, an action, wherein the action is one or more of a collaboration action and a services action, based on an assessment of the victim alert by the mentor.

3. The human trafficking case management and mentoring system of claim 2, wherein the action is communicated to one or more partners interconnected through the Coming Home server, wherein the one more partners is selected from the group consisting of a mentor, an advocate, a social worker; an anti-human trafficking expert, a medical doctor, a mental health professional; and an educator.

4. The human trafficking case management and mentoring system of claim 1, wherein the virtual reality engagement area is a victim selected simulated environment.

5. The human trafficking case management and mentoring system of claim 1, further comprising:
   the facial recognition module configured to translate one or more of a mentor facial movement and a mentor body movement with the virtual representation of the mentor within the virtual reality engagement area.

6. The human trafficking case management and mentoring system of claim 1, wherein the
   the facial recognition module is configured to receive, at the Coming Home server, a selfie facial image of the victim taken by the mobile computing device operated by the victim; and
   assess the selfie facial image at the Coming Home server to detect a sufficient number of facial recognition reference points to provide an accurate recognition of the victim based on the selfie facial image.

7. The human trafficking case management and mentoring system of claim 6, wherein the facial recognition module, further comprises:
   responsive to receiving a victim opt in command at the Coming Home server, sharing the selfie facial image with one or more law enforcement services.

8. The human trafficking case management and mentoring system of claim 1, wherein the plurality of configurable victim activated tools further comprises:
   a geofence tool configured to receive a victim input enabling a real time tracking of a victim position information; and
   receiving, at the Coming Home server, the victim position information.

9. The human trafficking case management and mentoring system of claim 8, wherein the geofence tool further comprises:
  receiving a victim input enabling communication of an alert by the Coming Home server to a law enforcement agency when the victim's position information indicates a victim movement into a restricted area.

10. The human trafficking case management and mentoring system of claim 1, the plurality of configurable victim activated tools further comprises:
  a jobs system connecting the victim with one or more vetted job opportunities vetted through a Coming Home server host.

11. A human trafficking case management and mentoring system (Coming Home) that links a victim of human trafficking (HT) with a plurality of human trafficking recovery and prevention resources, the system comprising:
  a Coming Home server hosting access to the plurality of HT recovery and prevention resources;
  a mobile computing device operated by the victim, provisioned with a Coming Home app providing a plurality of configurable victim activated tools to facilitate victim access to the plurality of HT recovery resources hosted by the Coming Home server, the plurality of configurable victim activated tools including:
    a goals/tasks/challenges module, comprising:
      a collaboration service hosted by the Coming Home server enabling a mentor and the victim to collaborate in setting of one or more of a goal, a task, and a challenge; and
      storing the one or more of the goal, the task, and the challenge in a database accessible by the victim through the Coming Home app;
      providing a reminder in the Coming Home app for a scheduled event associated with the one or more of the goal, the task, and the challenge;
      providing a completion indicator selectable by the victim to show the completion of a selected one of the one or more of the goal, the task, and the challenge;
      transmitting the completion indicator and the selected one of the one or more of the goal, the task, and the challenge; and
      presenting a leaderboard hosted by the Coming Home server, the leaderboard configured to display a real time tracking of the completion indicator for each the selected one of the one or more of the goal, the task, and the challenge.

12. A human trafficking case management and mentoring system (Coming Home) that links a victim of human trafficking with a plurality of human trafficking recovery and prevention resources, the system comprising:
  a Coming Home server hosting access to the plurality of human trafficking recovery and prevention resources comprising a virtual reality engagement area where the victim and a mentor may conduct an encounter; the virtual reality engagement area presented as a simulated environment presenting each of the victim and the mentor as a virtual representation within the virtual reality engagement area; and
  a mobile computing device operated by the victim, provisioned with a Coming Home app providing a plurality of configurable victim activated tools to facilitate victim access to the plurality of HT recovery resources hosted by the Coming Home server, the plurality of configurable victim activated tools including an interface for connecting with the virtual reality engagement area.

13. The human trafficking case management and mentoring system of claim 12, wherein the virtual reality engagement area is a victim selected simulated environment.

14. The human trafficking case management and mentoring system of claim 12, further comprising:
  a facial recognition module configured to translate one or more of a victim facial movement and a victim body movement with the virtual representation of the victim within the virtual reality engagement area.

15. The human trafficking case management and mentoring system of claim 12, further comprising:
  a facial recognition module to translate one or more of a mentor facial movement and a mentor body movement with the virtual representation of the mentor within the virtual reality engagement area.

16. The human trafficking case management and mentoring system of claim 14, further comprising:
  an artificial intelligence (AI) module configured to assess a victim affect within the virtual reality engagement area, based on one or more of the victim facial movement and the victim body movement.

* * * * *